United States Patent Office 3,012,917
Patented Dec. 12, 1961

3,012,917
METHOD OF PROTECTING METAL SURFACES
Marcel Riou, Neuilly, and Henri Richaud, Chambery, France, assignors to Pechiney Compagnie de Produits Chimiques et Electrometallurgiques, Paris, France
No Drawing. Filed Mar. 21, 1958, Ser. No. 722,856
Claims priority, application France Mar. 26, 1957
9 Claims. (Cl. 148—6.14)

The invention relates to a new method for protecting metal surfaces, involving a new use of chemical compounds therefor.

Numerous methods are known in the art of protecting metallic surfaces; thus it is well known to coat a metallic surface with a resin film, or to cover the surface with a layer of oxide or other compounds and impregnating that layer eventually with certain agents which are usually referred to as "sealing agents" in the art. The particular process to be employed in each case depends largely upon the conditions under which the desired protection treatment is to be carried out. A frequent difficulty is that of obtaining a sufficiently adherent protective coating which is at the same time tough, impermeable to corrosive agents and resistant to the latter.

Inorganic protective layers which are obtained by oxidation, phosphatation, sulfurization, chromatization, or other chemical or electrolytical operations, are improved also by such treatments as, in particular in the case of oxides formed on light metals, dipping into boiling water or treatment with alkaline solutions, silicates, fatty acids, sulfonated fatty acids, and the like.

Another drawback of electrolytically protective layers formed on metal surfaces, is a certain typical odor.

Yet another drawback of the known methods of treating protective layers on metal surfaces with sealing or similar agents is the requirement of applying high temperatures, of at least 50° C. and usually much higher, above 100° C., which high temperatures are not withstood by many protective layers, for instance by those containing dyes.

It is, therefore, an object of the present invention, to provide an important improvement which makes it possible to obtain inorganic protective layers as the surfaces of metallic articles, which offer an increased resistance to wear and to corrosion, which are free from the undesirable odor of electrolytically produced oxide layers, and which show a determined, selective receptiveness and retentiveness for moisture, which can be determined during the treatment.

It is a further object of our invention to provide for metallic surfaces protected with inorganic coatings which have an attractive, decorative appearance and show an improved property of causing the safe adherence of paints, varnishes, or plastic films thereon.

It is finally an object of the invention to provide a method of protective metallic surfaces bearing an inorganic coating susceptible to heat treatment, by treating the latter coating at temperatures below the boiling point of the applied sealing agent and preferably below 50° C.

The new method according to our invention, which permits to avoid the above-mentioned drawbacks, and achieves the aforesaid objects, is based on our discovery that the adsorption of an organic substance as a sealing agent in an inorganic layer on the surface of a metal is particularly strong and shows the above-mentioned excellent properties, when the sealing agent used is an organic, at least partly halogenated acid which comprises an aliphatic chain, in which carbon atoms bearing halogen atoms are free from strong acid groups such as sulfonic groups (—$SO_3$—) or phosphoric groups (—$PO_3$=)

A flow sheet illustrating the method and order of steps in the treatment of aluminum metal plate is as follows—

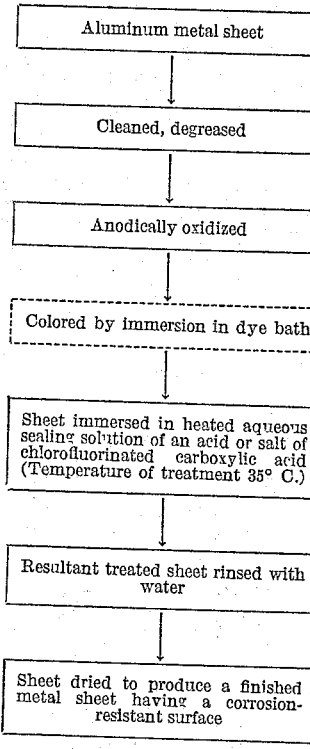

It is an important feature of our invention that the molecule of the sealing agent used in our method contains strongly acidic, i.e. primarily sulfonic and phosphoric groups, if any, only bonded to carbon atoms which are free from other electro-negative substituents such as a halogen atom. We have found that otherwise the acidic character of that combination of groups becomes excessive and prevents a fully satisfactory adhesion of the molecules in or on the treated surface.

Taking the above limitation into account, the sealing agent should consist of molecules which fulfil a number of conditions:

(1) The molecule of the sealing agent must contain a chain of at least two carbon atoms being linked to each other by a saturated bond, i.e. one electron pair;

(2) The molecule of the sealing agent must contain at least one free or combined acidic group, and preferably a carboxylic group;

(3) The molecule of the sealing agent should preferably contain other substituents of an acidic nature (electro-negative substituents) such as sulfonic, sulfinic, phosphoric, phosphinic, nitro, nitrile, chloro, fluoro, or bromo substituents (—$SO_3H$, —$SO_2H$, —$PO_3H_2$, —$PO_2H_2$, —$NO_2$, —$CN$, —$Cl$, —$F$, —$Br$) and the like;

(4) All acidic groups including the carboxylic group may be free acid groups, for instance —COOH or —$SO_3H$, or combined in the form of salts and esters such as alkaline metal or amine salts;

(5) Aliphatic carboxylic acids which are partly or completely chlorinated, brominated or fluorinated, or simultaneously chlorinated and fluorinated, are very suitable for carrying out the invention, either as free acids, or in the form of their alkaline metal or amine salts;

(6) There should be at least two groups of electronegative substituents in the molecule of the sealing agent in order to achieve a noticeable improvement of the qualities of the protective layer, and it is preferable that the number of the same is far greater than two. For example, in substances containing simultaneously carboxylic groups and sulfonic (—SO₃—) groups in each molecule, it is desirable that they have at least one carboxylic and one sulfonic group, and preferably more than two of at least one of these groups, i.e. for instance, more than two carboxylic groups and one sulfonic group, or more than two sulfonic groups and one carboxylic group, or more than two of either group per molecule.

(7) The molecule of the sealing agent may also contain electro-positive groups such as —NH₂, —OH, —CHO.

(8) The above-defined sealing agents should have molecular weights greater than 200 and preferably exceeding 450. Optimal results are achieved with sealing agents having a molecular weight exceeding 1000, while the upper limit for the molecular weight is determined only by the requirement of solubility of the agent in water or in an organic solvent.

(9) The organic substance serving as a sealing agent in the method according to the invention should be at least slightly soluble to permit its application to the metal surface to be protected. Weak solutions either in water or in an organic solvent, in which the sealing agent is present in amounts of at least 0.01% by weight, can be used, while concentrations of 0.1% to 15% by weight are preferred.

Among the substances which satisfy the above conditions, certain groups of substances give particularly satisfactory results. One of these groups can be characterized by the approximate general formula

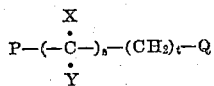

wherein:

C designates a carbon atom
H hydrogen atom
P a hydrogen, a halogen, or one of the above-referred-to acidic groups: —COO—, —SO₃—, etc.
X and Y are halogen atoms of the same or two different halogens
Q is a polar group which may be identical with P
"s" and "t" are integers, which may vary within large limits; "s" being preferably greater than 4, while "t" is equal to 0 or 1. The sum of s+t should be at least equal to 6.

The molecule may thus contain fluorine atoms alone, or chlorine jointly with fluorine and/or bromine, and/or iodine, and so forth.

Another important class of substances which are particularly suitable for carrying out the method according to the invention differs slightly from the above-described general formula in that the molecules of these substances contain in their chains such groups as

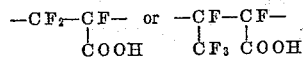

The following acids which may again be used as free acids or combined in the form of their salts or esters, as sealing agents in the method of the invention, are listed by way of example:

1,1-difluoro-undecanoic acid
1,1-dichloro-hendecanoic acid
Trichloro-phenyl-2-hydrogen-2-trifluoro-propionic acid
Sulfo-chloro-naphthyl-stearic acid
Trifluoro-undecylbenzene-sulfonic acid
Trifluoro-acetate-dodecylbenzene-sulfonic acid
Amine salts such as the chlorhydrate, phosphate, trifluoro-acetate, monochloro-propionate, and the like of dodecafluoroheptylamine and the like
Chloro-fluorinated carboxylic acids such as for example

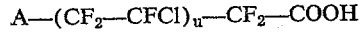

in which A is a polar or non-polar group or element, preferably Cl or F, while the number "u" is an integer one, more desirably comprised between 2 and 100. In this class of acids, low-molecular-weight compounds, as for example ClCF₂—CFCl—CF₂COOH or Cl(CF₂—CFCl)₂CF₂COOH are easily identified, while it is rather difficult to determine the exact composition of similar compounds having high molecular weights; however, the latter are very useful for carrying out the process of the invention.
Polyfluorinated carboxylic acids such as

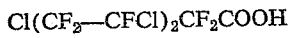

where A is hydrogen or fluorine and "u" a number preferably comprised between 5 and 200.
Polyhalogenated phosphoric acids, for example, decafluoro-hexyl-phosphonic acid, hexafluoro (chloro-, or bromo-) octylphosphonic acid, eicosafluoro-decylphosphonic acid, and the like.

Practically the simplest manner of treating inorganic layers on metallic surfaces with the described substances consists in dipping the metal articles to be treated into solutions of one or more of said substances, for a length of time such that the surface layer of the article absorbs a certain amount of the substance; after the withdrawal of the article from the solution, the excess of the latter is removed from the treated surface which is then generally rinsed, so that only the amount of directly absorbed sealing substance remains therein.

In general, the increase of the weight of an article when treated by the process according to the invention is from 0.1 gram to 15 grams per square meter of the treated surface. In most cases, this increase is comprised between 1 gram and 5 grams per square meter.

The treatment may also be carried out by spreading or spraying the solution on the surface of the article, and then draining or wiping, and generally rinsing it.

It is preferred that the protective organic substances containing acidic groups are in the form of their salts or esters. The choice of an adequate pH is very important for carrying out the new method successfully because the velocity of the fastening of the substance in the adsorbent layer, as well as the qualities of the layer treated, depend upon the pH of the solution; on the other hand, the optimum value of pH varies in relation with the nature of the inorganic layer and with that of the selected sealing agent. When the inorganic layer comprises oxides or trivalent metals such as aluminum, it is in general advisable to work in the vicinity of pH=7, but the admissible range of pH extends at least between 4 and 9, and preferably between 5 and 8.

According to the nature of the articles and the substances involved, the solution may comprise as a solvent, water or one or more organic liquids such as for example alcohols, chlorinated hydrocarbons, esters, ketones and the like; mixtures of water with organic liquids are suitable as solvents particularly in those cases where the sealing agent is not sufficiently soluble in water alone. From an economical point of view, aqueous solutions are preferred.

Highly improved surfaces can be obtained by using solutions containing together several of the sealing agents according to the invention.

The treatment may be effected at temperatures extending from room temperature up to 100° C. in the case of aqueous solutions, and even above 100° C. when higher boiling solvents are used. In many cases, it is possible and preferred to carry out the sealing operation at temperatures below 50° C., for example between 15° C. and 40° C.; this constitutes an important advantage over the known processes, which generally require much higher temperatures which are for instance harmful for dyes often used for the purpose of coloring metallic surfaces; moreover, certain layers of inorganic substances produced on metal surfaces suffer from an increase of temperature; in these cases, the method of our invention has the important advantage of permitting treatment at low temperatures.

While the salts of the acidic groups of the sealing substances used in the method according to our invention are chiefly those of sodium, potassium, and ethanolamine, other metals or amines may be also be used, provided the respective salts are sufficiently soluble; for example, Mg, Li, Ca, Al, Zn, Fe, Mn or other metal salts may be used, when their solubility exceeds 0.01%. Similarly, esters of a number of alcohols, such as methylic, ethylic, propylic, or butylic alcohols, glycols, triols and the like, as well as phenols, may replace the first-named salts.

The method of our invention may be applied to all metals capable of being coated with a thin layer of an adsorbent inorganic substance such as, for instance, the oxide of the base metal itself. The method according to the invention is, therefore, applicable to the surfaces of iron and related metals, light metals such as aluminum, titanium, zinc, copper, zirconium, and other metals, as well as the alloys of these metals.

When the sealing agent according to the invention consists of a halogenated organic substance of high molecular weight having substituted one or several polar groups per molecule, such substance may be of a resinous or waxy character. In this case, the substance may be applied to the surface to be protected by rolling a thin layer thereof onto the metallic surface. Such layer may be particularly useful when an additional layer of a plastic material is to be subsequently applied to the metal surface on top of the inorganic layer treated by the method according to our invention.

The invention will be further illustrated by a number of examples given below which are, however, not meant to be limitative in any way.

Example I

A plate of aluminum containing 99.5% Al is cleansed, degreased, and then anodically oxidized in a well known manner; after oxidation, the plate is rinsed and colored in a dyeing bath of "Indigosol Green I.B." (a dyestuff made by Durand & Hugueim, Switzerland), which is a sulfonic ester of the leucoderivative of benzene-2, benzene-2'-dimethoxy-dibenzanthrone. The plate is then immersed in an aqueous solution having a temperature of 35° C. and containing 2 grams per liter of the sodium salt of a chlorofluorinated acid, the approximative formula of which is: $(Cl(CF_2-CFCl)_2-CF_2COOH)_n$. The mean molecular weight of this substance is 2670, and it contains 31.4% Cl and 46.5% F. After an immersion of 150 minutes in the sealing solution, the plate is rinsed with water and dried. The increase in weight of the plate is 2.8 grams per square meter surface. The treated surface is very smooth and of pleasant touch; it has no longer the characteristic odor of anodically produced oxide. Furthermore, the surface exhibits a strong resistance to corrosion.

Example II

The same treatment as in Example I is effected with an aqueous solution of 2 grams/liter of the sodium salt of a chlorofluorinated acid having a molecular weight of 990 and a composition similar to that of the product employed in Example I. This chlorofluorinated acid contains 41.3% Cl and 46% F., while the theoretical amounts would be 31.6% and 45.1% respectively. The same results are obtained as in Example I.

Example III

Example I is repeated, but use is made of a chlorofluorinated acid having a molecular weight of 5100. It is employed at a concentration of 1 gram per liter, at 80° C. The acid contains 30.3% Cl and 48.5% F. A very satisfactory surface is obtained, which shows the same advantages as that obtained in the preceding example.

Example IV

In a treatment, carried out in the same manner as in Example II, the triethanolamine salt of the same acid as in Example II is used instead of the sodium salt. The results are identical with those of the repeated example.

Example V

Example I is repeated, but the sealing treatment is carried out at 80° C. during one hour. The results are identical with those of the repeated example.

Example VI

Example I is repeated, but the sealing treatment is carried out at boiling temperature during 30 minutes. The results are identical with those of the repeated example.

Example VII

The general procedure of Example I is applied to treating an aluminum plate with a solution containing 2 grams per liter of the sodium salt of a polyfluorinated carboxylic acid. This acid has approximately the formula $$F(CF_2)_{20}-COOH$$

a mean molecular weight 1020, and a content of fluorine of 71.2%. The results are very satisfactory.

Example VIII

Example I is repeated with the potassium salt of a polyfluoro-alkyl-phosphonic acid having the approximate formula $$H(CF_2-CFCl)_2-CF_2-CH_2-P(O)(OH)_2$$

and a molecular weight of about 520, dissolved in water in an amount of 0.07%. Treatment is carried out at a temperature of 45° C. for about 100 minutes.

Example IX

An iron plate is phosphatized according to the method well known in the art as "parkerization," and then dipped for 2 hours in an aqueous bath containing 5 grams per liter of a polyfluoroalkyl phosphonate of sodium as used in Example VIII. The temperature of the bath is maintained slightly above 60° C. The phosphatic layer on the iron plate is consolidated and the surface of the latter is given an attractive appearance.

Example X

The surface of an aluminum plate is first oxidized anodically as described in Example I, and then dipped for 6 hours into an aqueous bath having a temperature of about 70° C. and containing per liter 3 grams of the diethanolamine salt of a chlorofluorinated acid having an approximate formula of $$CH_3-(CF_2-CFCl)_n-CH_2-COOH$$

and a mean molecular weight of about 2960. This acid contains about 40% by weight of fluorine and 25.2% of chlorine. After the treatment in the bath is terminated, the plate is rinsed with water and dried. The increase of the weight of the plate is 1.9 gram per square meter of surface. The oxidic layer has lost completely its usual odor.

Example XI

A zinc object is superficially oxidized in a bath of an aqueous hydrogen peroxide solution having an alkaline pH of about 8. After rinsing, the object is immersed for one night in an aqueous solution of 1 gram per liter of dichloro-1,1-hendecanoate of potassium having a temperature of 30° C. After rinsing and drying, the object presents an attractive aspect and a greatly improved resistance to corrosion.

Example XII

The surface of a brass plate is sulfurized by a well known method, rinsed, and then immersed for about 8 hours into an aqueous solution containing 5 grams per liter of the monoethanolamine salt of a sulfochloronaphylstearic acid, containing a naphthyl group linked to an aliphatic chain of stearic acid and containing sulfo- and chloro-groups substituted at the naphthyl radical. The temperature of the bath is maintained between 40° and 50° C. After the plate has been rinsed and dried, its surface presents an attractive appearance, and an improved resistance to corrosion.

*Example XIII*

Example XII is repeated with an aqueous solution containing two grams per liter of the sodium salt of difluoro-1,1-hendecanoic acids. The results are identical with those of the repeated example.

It will be understood that while there have been given herein certain specific examples of the practice of this invention, it is not intended thereby to have this invention limited to or circumscribed by the specific details of materials, proportions or conditions herein specified, in view of the fact that this invention may be modified according to individual preference or conditions without necessarily departing from the spirit of this disclosure and the scope of the appended claims.

What we claim is:

1. A method of treating metals and metal surfaces to provide the same with a protective surface layer which is resistant to corrosion, said method comprising the steps of chemically pretreating the metal to provide the same with an inorganic coating, then immersing the pretreated metal in a solution containing an organic sealing agent which is absorbable by said inorganic coating, said organic sealing agent being selected from the group consisting of chlorofluorinated carboxylic acid and water-soluble salts thereof and said sealing agent being present in an amount between about 0.01% to 15% by weight of said solution, heating the treating solution while said metal is immersed in said solution to cause absorption of the same in the surface of said pretreated metal, and thereafter removing the metal and rinsing the same with water and drying the metal.

2. The method as set forth in claim 1, wherein the treating solution is pre-heated to a temperature of between about 15° C. and 100° C. prior to immersing of the metal to be treated therein.

3. A method of treating metals and metal surfaces to provide the same with a protective surface layer which is resistant to corrosion, said method comprising the steps of chemically pretreating the metal to provide the same with an inorganic coating, then immersing the pretreated metal in a solution containing an organic sealing agent which is absorbable by said inorganic coating, said organic sealing agent being selected from the group consisting of chlorofluorinated carboxylic acid and water-soluble salts thereof and said sealing agent being present in an amount between about 0.01% to 15% by weight of said solution, heating the treating solution while said pretreated metal is immersed in said solution for a period of from between one-half to three hours, and thereafter removing the metal and rinsing the same with water and drying the metal.

4. A method of treating metals and metal surfaces to provide the same with a protective layer which is resistant to corrosion, said method comprising the steps of chemically pretreating the metal to provide the same with an inorganic coating, then immersing the pretreated metal in a solution containing as an organic sealing agent an alkali metal salt of chlorofluorinated carboxylic acid and said sealing agent being present in an amount between about 0.01% to 15% by weight of said solution, maintaining said solution heated while said pretreated metal is immersed in said solution to a temperature of between 15 and 100° C., and thereafter removing the metal and rinsing the same with water and drying the metal.

5. A method of treating metals and metal surfaces to provide the same with a protective layer which is resistant to corrosion, said method comprising the steps of chemically pretreating the metal to provide the same with an inorganic coating, then immersing the pretreated metal in a solution containing as an organic sealing agent an ethanolamine salt of a chlorofluorinated carboxylic acid and said sealing agent being present in an amount between about 0.01% to 15% by weight of said solution, maintaining said solution heated to a temperature of between 15 and 100° C. while said pretreated metal is immersed therein, and thereafter removing the metal and rinsing the same with water and drying the metal.

6. A method of treating metals and metal surfaces to provide the same with a protective layer which is resistant to corrosion, said method comprising the steps of chemically pretreating the metal to provide the same with an inorganic coating, then immersing the pretreated metal in a solution containing as an organic sealing agent a chlorofluorinated carboxylic acid compound and said sealing agent being present in an amount between about 0.01% to 15% by weight of said solution, said compound having an average molecular weight in the range of 2,670 and 5,100, maintaining said solution heated to a temperature of between 15 and 100° C. while said pretreated metal is immersed therein, and thereafter removing the metal and rinsing the same with water and drying the metal.

7. A method of treating metals and metal surfaces to provide the same with a protective layer which is resistant to corrosion, said method comprising the steps of chemically pretreating the metal to provide the same with an inorganic coating, then immersing the pretreated metal in a solution containing an organic sealing agent which is absorbable by said inorganic coating, said organic sealing agent being selected from the group consisting of chlorofluorinated carboxylic acid and water-soluble salts thereof and said sealing agent being present in an amount between about 0.01% to 15% by weight of said solution, and wherein the fluorine content is about 40% by weight and the chlorine content is approximately 25.2%, maintaining said solution heated to a temperature of between 15 and 100° C. while said metal is immersed therein, and thereafter removing the metal and rinsing the same with water and drying the metal.

8. A method of treating metals and metal surfaces to provide the same with a protective layer which is resistant to corrosion, said method comprising the steps of chemically pretreating the metal to provide the same with an inorganic coating, then immersing the pretreated metal in a solution containing an organic sealing agent which is absorbable by said inorganic coating, said organic sealing agent being selected from the group consisting of chlorofluorinated carboxylic acid and water-soluble salts of a polyfluorinated carboxylic acid and said sealing agent being present in an amount between about 0.01% to 15% by weight of said solution, said solution being maintained heated to a temperature of between 15 and 100° C. while said pretreated metal is immersed therein, and thereafter removing the metal and rinsing the same with water and drying the metal.

9. A method of treating metals and metal surfaces to provide the same with a protective layer which is resistant to corrosion, said method comprising the steps of chemically pretreating the metal to provide the same with an inorganic coating, then immersing the pretreated metal in a solution containing an organic sealing agent which is absorbable by said inorganic coating, said organic sealing agent being selected from the group consisting of chlorofluorinated carboxylic acid and water-soluble salts of a chlorofluorinated carboxylic compound wherein the fluorine content is from 45 to 50% and the chlorine 30 to 35% by weight of the acid and said sealing agent being present in an amount between about 0.01% to 15% by weight of said solution, said solution being maintained heated while said pretreated metal is immersed therein, to a temperature between 15 and 100° C., and thereafter removing the metal and rinsing the same with water and drying the metal.

References Cited in the file of this patent

UNITED STATES PATENTS

| | | |
|---|---|---|
| 1,869,042 | Bengston | July 26, 1932 |
| 2,224,695 | Prutton | Dec. 10, 1940 |
| 2,284,241 | Werntz | May 26, 1942 |
| 2,311,653 | Farrington et al. | Feb. 23, 1943 |
| 2,334,158 | Hugo | Nov. 9, 1943 |
| 2,368,607 | White | Jan. 30, 1945 |
| 2,698,262 | Balmas | Dec. 28, 1954 |
| 2,802,028 | England | Aug. 6, 1957 |
| 2,806,866 | Barnhart | Sept. 17, 1957 |
| 2,806,867 | Barnhart | Sept. 17, 1957 |
| 2,930,106 | Wrotnowski | Mar. 29, 1960 |